Patented July 25, 1950

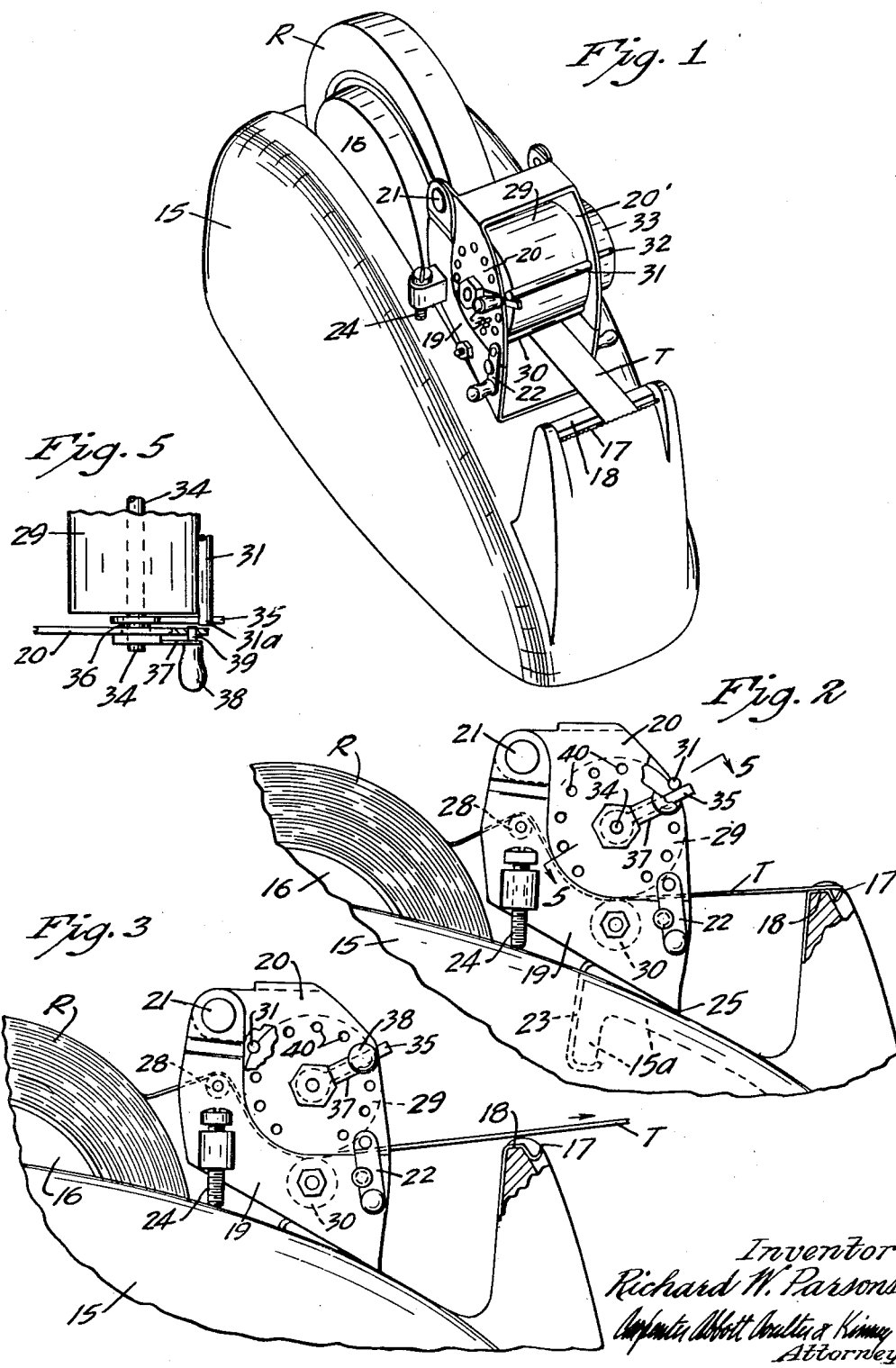

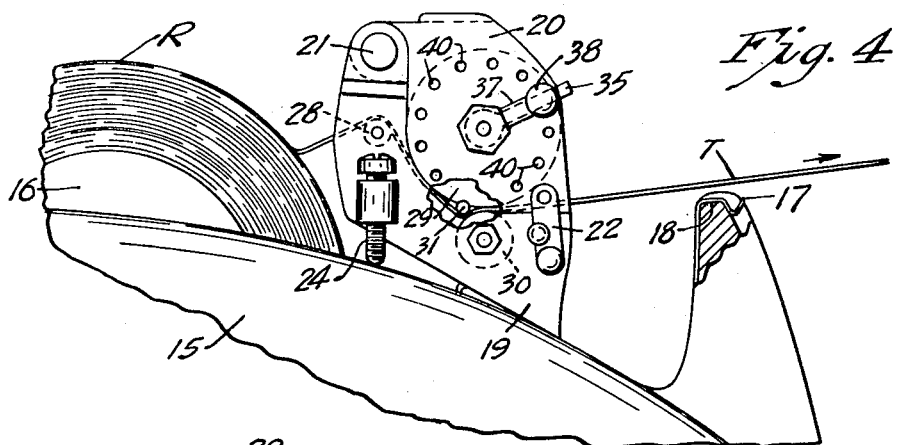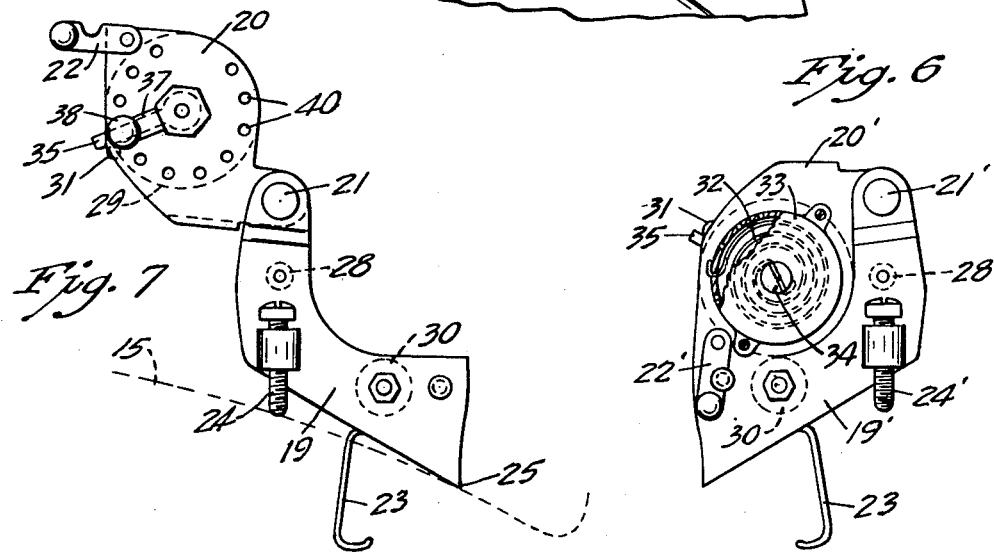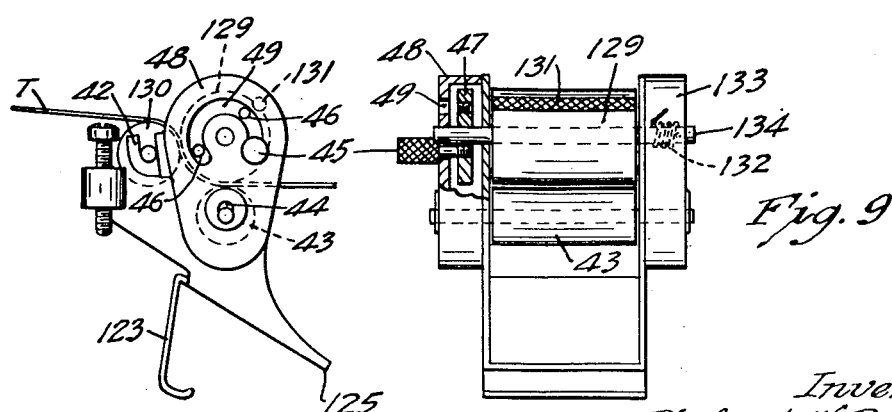

2,516,143

UNITED STATES PATENT OFFICE 2,516,143

METERING TAPE DISPENSER

Richard W. Parsons, Jacksonville, Fla., assignor to Minnesota Mining & Manufacturing Company, St. Paul, Minn., a corporation of Delaware Application July 17, 1948, Serial No. 39,354

9 Claims. (Cl. 33—130)

This invention relates to tape dispensers which meter the tape, more particularly to metering dispensers for pressure-sensitive adhesive tape.

Previous metering dispensers have had to be specially constructed throughout. It is therefore one of the objectives to provide a metering unit that can be used as an attachment on standard commercial dispensers without alteration of the latter. Other objectionable features of previous devices include lack of adequate resistance to further tape withdrawal after the desired length has been paid out. One of the objectives is therefore the provision of a metering unit that has a more positive stop for the tape.

The invention provides a metering unit that may be attached to or originally built in as a part of, tape dispensers that include a tape supply means and a severing means that is spaced from the supply means, the unit being positioned between the two.

The unit comprises a rotatable measuring drum positioned to contact the tape and to be rotated thereby when the tape is drawn through the unit. After the drum has turned a given distance, thereby measuring off a desired length of tape, a stop or pinch member on the drum engages a stop or pinch member adjacent the drum with the tape pinched between them, and this halts not only the rotation of the drum but also the passage of the tape.

An illustrative device is described herein and illustrated in the accompanying drawings in which:

Figure 1 is a perspective view;

Figures 2, 3 and 4 are left side fragmentary elevations showing parts of the metering unit in successive positions during operation;

Figure 5 is a fragmentary section of the unit taken on the line 5—5 in Figure 2;

Figure 6 is a right side elevation of the unit;

Figure 7 is a left side elevation of the unit opened for threading; and

Figures 8 and 9 are right side and front elevations, respectively, of an alternative form of the unit.

Toward the rear of the base or body 15, a supply roll R of pressure-sensitive adhesive tape T is mounted on a rotatable supply drum 16. At the front is a severing edge 17, behind which is a shelf or ledge 18 to which the tape may temporarily adhere when brought into contact with the edge 17 in a severing operation.

The metering unit is positioned between the supply roll R and the severing means 17. It comprises a lower body portion having side walls 19— 19' and an upper body portion having side walls 20—20'. The two portions are hinged at 21—21' and are held together by latch members 22—22'. The portions are normally closed and latched, as shown in Figure 2. They may be unlatched and opened for convenience in threading the tape through the machine, as shown in Figure 7.

The unit is removably fixed to the body 15 by a tongue 23 that extends downwardly from the unit into the body. Set screws 24—24' threaded to the rear of the lower portion of the unit may be turned to impel the rear of the unit upwardly with the lower front edge 25 acting as a fulcrum until the tongue 23 bears tightly against the wall 15a of the body, thereby rendering the unit fixed in relation to the body.

The tape is led into the unit from the supply roll R over an idle lead-in roller or guide roller 28 and thence around the under side of a rotatable drum 29 with the back or non-tacky side of the tape against the periphery of the drum.

A pinch member is positioned adjacent the periphery of the drum 29 in the form of an idler roller 30 parallel with the drum, with the tape passing between the drum 29 and the pinch roller 30 as the tape is drawn from the supply through the unit to the severing means. A second pinch member is positioned on the periphery of the drum 29 in the form of a rod or bar or ridge 31, fixed to the drum and parallel therewith.

As tape is drawn through the machine from the supply to the severing means by grasping the leading end and pulling it in the direction of the arrows in Figures 3 and 4, it rotates the drum 29 counter clockwise (Figures 2, 3 and 4) by reason of the frictional contact between the back of the tape and the periphery of the drum until the second pinch member 31 engages the first pinch member 30 with the tape pinched between them, as shown in Figure 4, whereby the drum is stopped and withdrawal of the tape is halted.

The tape may then be severed by drawing it downwardly against the edge 17. This will adhere the uncut portion of the tape to the shelf 18. Lifting it therefrom in preparation for withdrawing the next length lessens the tension on the tape and the pressure on the drum 29 whereupon the drum is returned from its stopped or metering position shown in Figure 4, to its normal or initial starting position shown in Figure 2 by the force of a spring 32 shown in Figure 6. The unit thus resets itself automatically in readiness for the next metering cycle.

The spring 32 is within a housing 33 that is fixed to the right side 20' of the unit, its outer end anchored to the peripheral wall of the housing and its inner end anchored to the axle 34 of the drum 29, the axle being fixed in respect to the drum.

The said spring-impeller return of the drum 29 is halted when a return catch 31a (which in the machine of Figures 1 to 7 is an extension of the pinch bar 31, clearly shown in Figure 5) engages a return stop 35 adjacent the drum.

It will be seen that the length of tape that is dispensed in a single complete metering cycle corresponds directly to the distance through which the drum turns from its normal position (Figure 2) to its metering position (Figure 4) and that this distance may be varied by changing the location or position of the fixed return stop 35.

To accomplish this, the stop 35 is here made as an elongate member, pivotally mounted to turn about the axis of the drum, like the hand of a clock, between the side plate 20 and the drum 29 (Figure 5). The pivotal end is fixed to a collar 36 which surrounds the drum axle 34 and is concentric therewith. The axle is journalled in the collar and the collar is journalled in the side plate 20, projecting through the plate in both directions. On the outer side of the plate, a spring steel arm 37 having a knob 38 at its end on its outer side and a peg 39 on its inner side, is fixed to the outer end of the collar 36. The peg 39 registers with a series of apertures or holes 40 in the plate 20.

The arm 37 and the stop 35 move in unison. By pulling the knob 38 so as to bend the spring steel arm 37 outwardly and thereby withdraw the peg 39 from the particular hole 40 that it then occupies, the arm may be moved clockwise or counter-clockwise to another hole, thereby fixing the stop 35 in a new position. The machine may thus be adjusted to dispense any one of a number of different lengths of tape, depending on the number and distance apart of the holes 40.

There are numerous alternatives and variables. Some of these are illustrated in the unit shown in Figures 8 and 9. The roller 130 is positioned to serve as the pinch roller as well as a guide or lead-in roller. In this embodiment, the drum is halted and the withdrawal of tape stopped when the pinch bar 131 engages the roller 130 with the tape T pinched between them. The roller 130 is supported in open U-shaped bearings 42 to permit temporary removal of the roller when threading tape through the unit.

The roller 43 is an idler. It is shown journalled in elongate vertical apertures 44 in the side walls of the unit, thus permitting its movement up and down. This permits close contact between the tape and the drum 129 when tape is being withdrawn regardless of variance in the thickness of the tape; and at the same time, full clearance between the tape and drum is insured when the drum is being turned back by the spring 132 since the roller 43 drops down when tension on the tape is relaxed. The tacky side of the tape contacts the roller.

The spring 132 operates similarly to the spring 32 to return the drum 129 to its normal or starting position after a length of tape has been metered. The return catch in Figures 8 and 9 is in the form of a screw peg 45 which fits a series of holes 46 in a stop wheel 47 that is fixed to the drum axle 134, the wheel being enclosed in a housing 48. An arcuate slot or aperture 49 concentric with the drum and wheel, registers with the series of holes so that the peg 45 may be screwed into any one of the holes 46 with its outer end extending outwardly through the slot. When the drum is turned clockwise by the spring 132, it will be halted in a given normal or starting position when the peg 45 comes to the end of the slot 49, as shown in Figure 8. The peg 45 thus serves as a return catch, the housing 48 as a return stop. Changing the peg from one to another of the various holes 46 in the stop wheel 47 will change the length of tape that the unit will meter or pay out.

In the device of Figures 1 to 7, the pinch roller 30 may be journalled in a manner to permit its movement up and down, like the idler roller 43 in Figures 8 and 9, if desired.

The release of tape pressure on the drum following a dispensing operation need not always await the lifting of the tape from the shelf 18. It may occur whenever the operator relaxes the pull on the tape. Consequently the unit may be reset before severance, or whenever desired. Multiples of the unit length for which the machine is adjusted may thus be dispensed if desired. The release of the tape tension frequently occurs automatically immediately after severance because of slight adherence to the shelf 18 or for other reasons. The shelf 18 is of course not essential to the operation of the device.

The guide roller 28 may be dispensed with, but it is usually desirable to increase the amount of wrap around the drum 29.

The claimed invention may of course take numerous forms other than those described and illustrated herein.

I claim:

1. In an adhesive tape dispenser which comprises means for holding a supply of tape and means for severing the tape after withdrawal from the supply, a metering unit between the supply and the severing means comprising a rotatable measuring drum positioned to have its periphery contact the non-adhesive side of the tape when tape is being withdrawn from the supply and to be rotated in one direction by traction of the tape, a first pinch member positioned adjacent the drum's periphery with the tape between the drum and the pinch member, and a second pinch member on the periphery of the drum and projecting therefrom positioned to engage the first pinch member with the tape pinched between them upon rotation of the drum in the said direction in response to withdrawal of the tape.

2. The device of claim 1 with spring means loaded to rotate the drum in the opposite direction, a catch member associated with the drum and a stop member adjacent the drum positioned to engage the catch and halt the drum after the spring means has rotated the drum to a given initial position in readiness for a complete metering cycle.

3. The device of claim 1 with an idler roller contacting the adhesive side of the tape between the supply and the drum positioned to increase the amount of wrap around the drum as the tape extends from the supply to the severing means.

4. The device of claim 1 in which the metering unit is in two separable parts, an upper part and a lower part, the drum being carried by the upper part and the first pinch member by the lower part, and means for releasably holding the parts together.

5. A tape metering unit for attachment to a tape dispenser that includes a tape supply holding means and a severing means that is spaced from the supply, the said unit comprising a frame through which tape may be drawn, a measuring drum rotatably mounted in the frame in a position to engage the tape and to be rotated by traction of the tape when the tape is being drawn through the unit, a first pinch member mounted in the frame adjacent the portion of the drum that is contacted by the tape, and a second pinch member on the drum and projecting therefrom positioned to engage the first pinch member with the tape pinched between them when the drum is rotated by traction of the tape.

6. In an adhesive tape dispenser which comprises means for holding a supply of tape and means for severing the tape after withdrawal from the supply, a metering unit between the supply and the severing means comprising a rotatable measuring drum positioned to have its periphery contact the non-adhesive side of the tape when tape is being withdrawn from the supply and to be rotated in one direction by traction of the tape, a first pinch member positioned adjacent the drum's periphery with the tape between the drum and the pinch member, and a second pinch member on the periphery of the drum and projecting therefrom positioned to engage the first pinch member with the tape pinched between them upon rotation of the drum in the said direction in response to withdrawal of the tape, the first pinch member being a roller, the axes of the roller and the drum being parallel, and the second pinch member being a ridge extending transversely of the periphery parallel with the axis of the drum.

7. The device of claim 6 with spring means loaded to rotate the drum in the opposite direction, a catch member associated with the drum and a stop member adjacent the drum positioned to engage the catch and halt the drum after the spring means has rotated the drum to a given initial position in readiness for a complete metering cycle.

8. The device of claim 6 with an idler roller contacting the adhesive side of the tape between the supply and the drum positioned to increase the amount of wrap around the drum as the tape extends from the supply to the severing means.

9. The device of claim 6 in which the metering unit is in two separable parts, an upper part and a lower part, the drum being carried by the upper part and the first pinch member by the lower part, and means for releasably holding the parts together.

RICHARD W. PARSONS.

REFERENCES CITED

The following references are of record in the file of this patent:

UNITED STATES PATENTS

| Number | Name | Date |
| --- | --- | --- |
| 2,251,942 | Kimball | Aug. 12, 1941 |
| 2,291,668 | Weigolt | Aug. 4, 1942 |
| 2,424,488 | Morin | July 22, 1947 |